United States Patent [19]

Siegel et al.

[11] 3,928,015
[45] Dec. 23, 1975

[54] MANUFACTURE OF UREA-AMMONIUM SULATE FROM SULFURIC ACID, AMMONIA, AND UREA

[75] Inventors: Milton R. Siegel; Oscar E. Moore, both of Florence, Ala.

[73] Assignee: Tennessee Valley Authority, Muscle Shoals, Ala.

[22] Filed: June 9, 1975

[21] Appl. No.: 580,837

Related U.S. Application Data

[63] Continuation of Ser. No. 518,413, Oct. 29, 1974.

[52] U.S. Cl. .................... 71/28; 71/64 D; 423/549
[51] Int. Cl.² .................. C05C 3/00; C05C 9/00
[58] Field of Search ............. 71/28–30, 37–41; 423/549

[56] References Cited
UNITED STATES PATENTS

| | | | |
|---|---|---|---|
| 2,766,107 | 9/1956 | White | 71/28 |
| 3,172,751 | 3/1965 | Datin | 71/40 |
| 3,619,160 | 11/1971 | Gabrielson | 71/30 |
| 3,785,796 | 1/1974 | Mann, Jr. | 71/04 |

FOREIGN PATENTS OR APPLICATIONS

| | | | |
|---|---|---|---|
| 1,112,091 | 8/1961 | Germany | 71/30 |

Primary Examiner—Frank A. Spear, Jr.
Assistant Examiner—Ferris Lander
Attorney, Agent, or Firm—Robert A. Petrusek

[57] ABSTRACT

Urea-ammonium sulfate is produced in a two-stage process wherein sulfuric acid is ammoniated to the bisulfate level in a first-stage reactor, then further ammoniated to the ammonium sulfate level in a second-stage reactor with the simultaneous addition thereto of molten urea. The fluid medium of molten urea maintains the ammonium sulfate crystals in a slurry that can be easily transferred and granulated. The novelty of the process lies in the production of solid ammonium sulfate in the fluid medium of molten urea, thereby eliminating the necessity of separate ammonium sulfate production facilities.

13 Claims, 1 Drawing Figure

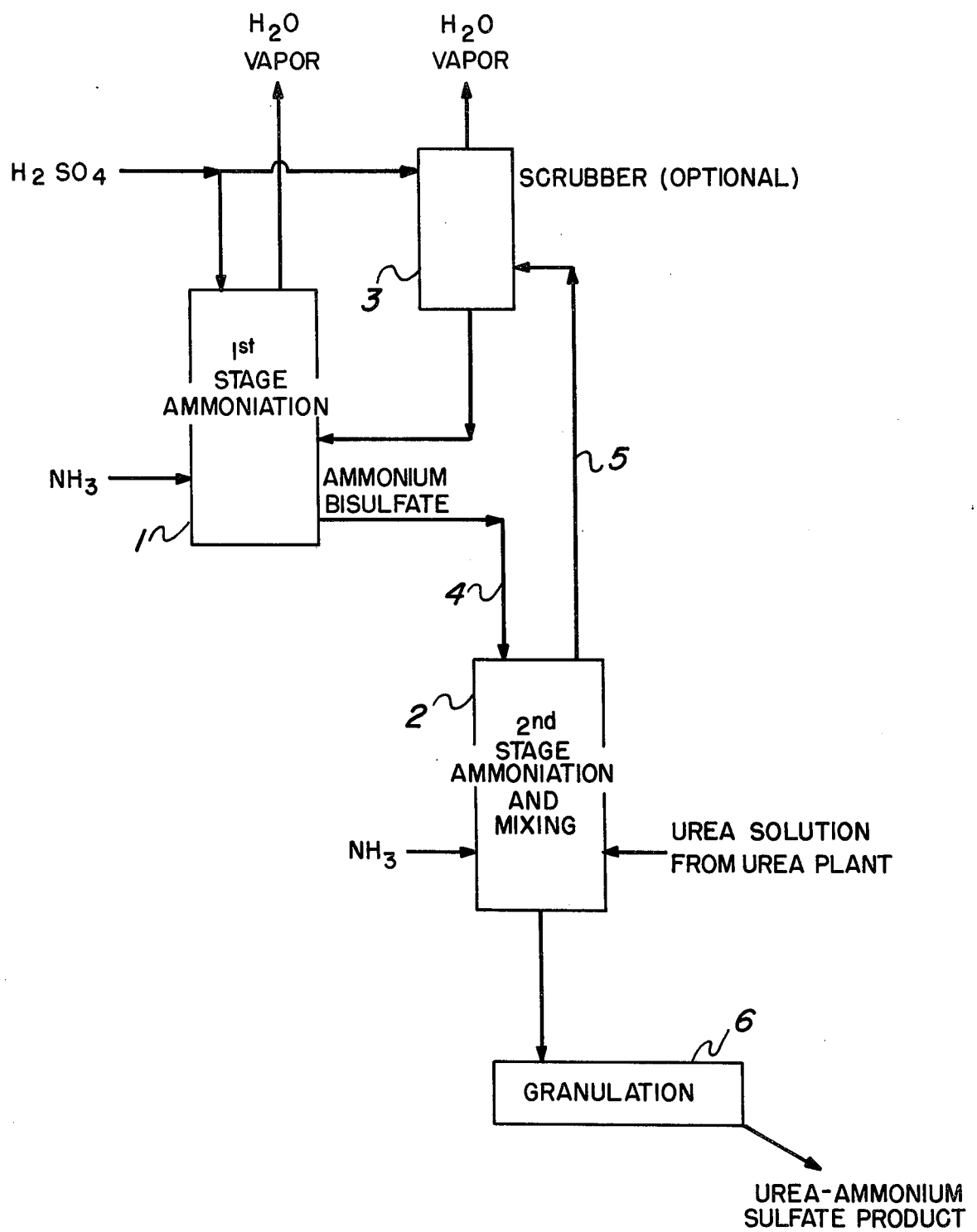

MANUFACTURE OF UREA-AMMONIUM SULATE FROM SULFURIC ACID, AMMONIA, AND UREA

The invention herein described may be manufactured and used by or for the Government for governmental purposes without the payment to us of any royalty therefor.

This application is a continuation of our copending application Ser. No. 518,413, filed Oct. 29, 1974, for Manufacture of Urea-Ammonium Sulfate from Sulfuric Acid, Ammonia, and Urea.

The present invention relates to a process for the production of urea-ammonium sulfate fertilizer from sulfuric acid, ammonia, and urea. At the present time apparently no existing process is known for the production of urea-ammonium sulfate by the direct ammoniation of sulfuric acid with the simultaneous addition of molten urea or a highly concentrated aqueous solution of urea at moderately elevated temperatures. Indeed, current commercial production of urea-ammonium sulfate is accomplished by physically mixing the two compounds by a process of adding pulverized solid ammonium sulfate to molten urea in a granulation step, such as a drum, a pan granulator or prilling apparatus, as, for example, in U.S. Pat. No. 3,785,796, Mann, Jr. The viability of this procedure depends upon an economical and reliable source of solid ammonium sulfate. Solid ammonium sulfate which has a relatively high melting point is produced by crystallization from a saturated solution in large, expensive vacuum crystallizers or continuous ammoniator granulation units as, for example, in U.S. Pat. No. 3,464,809, Hicks. Indeed, ammonium sulfate decomposes at about 950°F, which is below its melting point; therefore, ammonium sulfate obviously cannot be granulated from an anhydrous melt thereof.

The novelty of the present invention resides in the use of a flux of molten urea for rapidly ammoniating a concentrated solution of ammonium bisulfate to form essentially anhydrous ammonium sulfate in the form of a slurry at temperatures of about 300°F, while simultaneously expelling the water introduced with the ammonium bisulfate and discharging the fluid urea-ammonium sulfate as an essentially anhydrous, homogeneous slurry to a granulating device. The proportions of urea to ammonium sulfate and temperatures and times used in the present invention are given in detail infra. Thus, the novel approach in the process of the present invention eliminates the necessity of separate production of solid ammonium sulfate in costly equipment by carrying out the ammonia-sulfuric acid reaction in the fluid medium of molten and essentially anhydrous urea in simple and inexpensive tank-type or pipe-type reactors.

It is therefore an object of the present invention to provide a direct process for producing urea-ammonium sulfate from urea, sulfuric acid, and ammonia. Another object of the present invention is to feed urea, sulfuric acid, and ammonia simultaneously to the process. Still another object of the present invention is to produce the desired amount of essentially anhydrous ammonium sulfate in admixture with molten urea in simple, inexpensive reactors in comparison with the large, costly equipment involved in the prior art previously described. A further object of the present invention is to provide a continuous two-stage process whereby "spent," or byproduct, sulfuric acid can be utilized in the production of urea-ammonium sulfate. Still a further object of the present invention is to provide a process for production of urea-ammonium sulfate from the most economical and most readily available source of sulfate. A still further object of the present invention is to provide a process for production of a high-nitrogen fertilizer that contains the secondary nutrient, sulfur. Other objects and advantages of the present invention will become apparent as the disclosure proceeds.

We have now discovered that hard, friable urea-ammonium sulfate products of low moisture content can be produced in a two-stage process wherein spent or virgin sulfuric acid, in the range of concentrations of 40 to 93 percent sulfuric acid, is ammoniated in a first-stage reactor to approximately the bisulfate level; that is, an $NH_3:SO_4$ mole ration 0.8 to 1.2, but preferably about 1.1. This degree of amoniation has been found to give maximum fluidity, and therefore, maximum release of water vapor (where dilute acids are used) from the hot first-stage solution.

In one alternative embodiment of the present invention that is not particularly significant to the spirit underlying the present invention, the acid feed to the first stage may be divided into two streams, one going directly to the first-stage reactor, and the other passing through an offgas scrubber to recover excess ammonia from the second stage before being discharged into the first-stage reactor.

The effluent from the first stage then is further ammoniated to the ammonium sulfate level ($NH_3:SO_4$ mole ratio of 2.0) in a second-stage reactor with the simultaneous addition of urea solution or melt to the second stage. Offgases (excess ammonia and water vapor) from the second stage are recycled to the first stage by any prior art method; one such method is described supra in said alternative embodiment. The effluent from the second stage is subsequently cooled and granulated by any convenient means known to the art.

The principal advantage of the process of the present invention over the prior art previously described is that an essentially anhydrous, homogeneous mixture of urea and ammonium sulfate can be produced in desirable nitrogen to sulfur ratios in simple tank-type reactors or in even simpler pipe or "tee" reactors, using the molten urea as the fluid medium in which to precipitate ammonium sulfate crystals. Thus, the production of the ammonium sulfate can be accomplished without the expensive crystallizers or continuous ammoniators that are required in the prior art mentioned previously. The slurry of ammonium sulfate crystals in molten urea formed in the second stage is quite fluid and can be easily transferred and granulated.

The present invention, together with further objects and advantages thereof, will be better understood from a consideration of the following description taken in connection with the accompanying drawing in which:

The FIGURE is a diagrammatic flowsheet illustrating the sequence of steps in the process embodying principles of the present invention. Principal items are first-stage reactor or ammoniator 1 and second-stage reactor and mixer 2. These two items are necessary in this embodiment of the invention. Of use in the process, but not essential to the invention, is scrubber 3 for the offgases from second stage 2 and granulator 6 for the urea-ammonium sulfate product.

First-stage reactor 1 is a simple open tank-type, insulated reactor equipped with an agitator, not shown, and heating coils (for very dilute acid). As shown, sulfuric acid (40–93 percent $H_2SO_4$) is fed into first-stage reactor 1 at a rate predetermined by the final grade of product desired. Also, as shown in the drawing, in one embodiment of the present invention, but not critical to its application, the acid feed may be split, part going to second-stage offgas scrubber 3 before returning to first-stage reactor 1. The acid can be byproduct, or spent, sulfuric acid and can contain some impurities since, in fertilizer production, pure products are not required. Ammonia is fed into first-stage reactor 1 at a rate adjusted to give a first-stage product of ammonium bisulfate ($NH_3:SO_4$ mole ratio of 0.8 to 1.2; 1.1 being preferable).

The temperature of first-stage reactor 1 is held at 240°F to 260°F either by the heat of reaction of the acid and ammonia, or with external heat (only for very dilute acids). This elevated temperature evaporates most of the water associated with the acid. Retention times as low as 4 minutes have been found to give adequate water vapor disengagement.

The ammonium bisulfate slurry formed in first-stage reactor 1 is then transferred via line 4, preferably by gravity flow, to second-stage reactor 2 for the addition of more ammonia (to the ammonium sulfate level; $NH_3:SO_4$ mole ratio of 2.0) with the simultaneous addition of urea solution or melt. In order to minimize urea decomposition when urea comes in contact with the retained volume of slurry in second-stage reactor 2, it is preferable but nor necessary to use pipe or tee reactors which have low retention volumes and therefore low retention times, i.e., say one to 15 seconds. This, however, is not believed to be critical to the application of the principle of this invention, and second-stage reactor 2 may be a simple agitated, open tank-type reactor similar to first-stage reactor 1. A tank-type reactor is especially adaptable for the lower sulfur-grade products (about 4 percent sulfur).

In second-stage reactor 2, the ammonia rate is adjusted to bring the $NH_3:SO_4$ mole ratio up to 2.0 (ammonium sulfate) and the urea is simultaneously added in the quantity needed for the grade of product desired. For lower sulfur grades, up to about 5 percent sulfur, retention times of up to 4 minutes could be used without severe urea losses by hydrolysis and biuret formation. For sulfur contents above 5 percent, the retention time should be 1 minute, or less. The urea fed into second-stage reactor 2 is preferably a melt (99+ percent urea at 280° to 310°F) and is fed directly, as indicated, from a urea solution plant evaporator. However, the nominal concentration of urea solution from the urea synthesis plant (about 75 percent by weight) may be used if some external heat is applied to second-stage reactor 2 to evaporate the additional water.

In bringing second-stage reactor 2 up to the proper $NH_3:SO_4$ ratio, some of the ammonia added is volatilized in offgases ducted by line 5. These offgases in line 5, which include mainly ammonia and water vapor, are recycled to first stage 1 by any convenient means known to the art, such as acid scrubber 3 or an insulated vapor compressor system.

The effluent, low in moisture content (1–3 percent by weight) from second-stage reactor 2 is fed into granulator 6 for cooling and granulation by any form of prior art.

In order that those skilled in the art may better understand how the present invention can be practiced, the following examples of processes we have used in the production of urea-ammonium sulfate from sulfuric acid, ammonia, and urea are given by way of illustration and not necessarily by way of limitation since numerous variations and embodiments thereof still within the spirit and scope of the instant invention will occur to those skilled in this art.

EXAMPLE I

The laboratory demonstration of the present invention was accomplished in equipment designed to give a production rate of about 400 grams per minute of urea-ammonium sulfate. A urea melter was used to simulate the effluent from a urea synthesis plant. It was an 1100-milliliter (retained volume) insulated, stainless steel tank, steam traced both internally and externally. The first-stage reactor has a retained volume of 300 milliliters, and the second stage had a retained volume of 425 milliliters; both were glassware. Both were mechanically agitated and heavily insulated.

A 40-0-0-4S grade urea-ammonium sulfate fertilizer was produced using diluted chemically pure sulfuric acid (60 percent $H_2SO_4$) to simulate byproduct acid, ammonia, and commercial-grade urea prills. The urea prill feed to the melter was controlled by use of a double roll feeder. The excess ammonia from the second stage was not recovered in this laboratory unit.

The conditions and results of the test were as shown in the following tabulation.

| | |
|---|---|
| Urea:$(NH_4)_2SO_4$ weight ratio | 4 |
| First stage | |
| Feed rate, g/min | |
| $H_2SO_4$ (60 percent) | 108 |
| $NH_3$ | 11.5 |
| Calculated $NH_3:SO_4$ mole ratio | 1.0 |
| Retention time, min | 3.8 |
| Temperature, °F | 250 |
| Urea solution (or melt) | |
| Temperature, °F | 290 |
| Biuret, wt. % | 2.0 |
| Second stage | |
| Feed rate, g/min | |
| Urea | 309 |
| $NH_3$ | 20.7 |
| Retention time, min | 1.5 |
| Temperature, °F | 310 |
| Product | |
| pH, 5 percent solution | 6.2 |
| Analysis, wt. % | |
| Total N | 40.4 |
| $NH_3$-N | 4.7 |
| $SO_4$ | 15.9 |
| Biuret | 2.9 |
| $H_2O$ | 1.2 |
| Grade, percent | |
| N | 40.4 |
| S | 5.3 |
| $NH_3:H_2SO_4$, mole ratio | 2.0 |
| Urea decomposition, % of urea | |
| Hydrolyzed | 0 |
| Forming biuret | 1.6 |

In this laboratory unit, the products were caught in pans and cooled with a cold water bath instead of granulated, but the products were hard and friable and of low moisture content.

EXAMPLE II

Production of a 38-0-0-7S grade urea-ammonium sulfate fertilizer was demonstrated in the same equipment described in Example I. The feed materials were again diluted chemically pure sulfuric acid (60 percent $H_2SO_4$), ammonia, and molten urea.

The condition and results of the test were as follows:

The condition and results of the test were as follows:

| | |
|---|---|
| Urea:(NH$_4$)$_2$SO$_4$ weight ratio | 2.33 |
| First stage | |
| Feed rate, g./min | |
|   H$_2$SO$_4$ | 92.5 |
|   NH$_3$ | 11.5 |
|   Calculated NH$_3$:SO$_4$ mole ratio | 1.2 |
| Retention time, min. | 4.3 |
| Temperature, °F | 243 |
| Urea solution (or melt) | |
|   Temperature, °F | 281 |
|   Biuret, wt. percent | 2.0 |
| Second stage | |
| Feed rate, g./min. | |
|   Urea | 188.5 |
|   NH$_3$ | 22.5 |
| Retention time, min. | 2.2 |
| Temperature, °F | 277 |
| Product | |
|   pH, 5 percent solution | 6.1 |
| Analysis, wt. percent | |
|   Total N | 37.9 |
|   NH$_3$-N | 6.1 |
|   SO$_4$ | 20.7 |
|   Biuret | 1.6 |
|   H$_2$O | 2.8 |
| Grade, percent | |
|   N | 37.9 |
|   S | 6.9 |
| NH$_3$:H$_2$SO$_4$ mole ratio | 2.0 |
| Urea decomposition, % of urea | |
|   Hydrolyzed | 6.6 |
|   Forming biuret | 0.4 |

The products were collected and cooled as in Example I. The products were again hard and friable with a relatively low moisture content. The moisture content could be reduced further in a granulation step, which would raise the grade above the 38-0-0-7S grade predicted. The urea loss by hydrolysis was relatively large, but could be minimized in a pipe, or tee, reactor that normally has a very short retention time.

EXAMPLE III

Production of a 37-0-0-8S grade urea-ammonium sulfate fertilizer was demonstrated in the same equipment described in Example I. The feed materials were also the same: diluted chemically pure sulfuric acid (60 percent H$_2$SO$_4$), ammonia, and molten urea.

The conditions and results of the test were as follows:

| | |
|---|---|
| Urea:(NH$_4$)$_2$SO$_4$ weight ratio | 1.86 |
| First stage | |
| Feed rate, g./min. | |
|   H$_2$SO$_4$ (60 percent) | 100 |
|   NH$_3$ | 11.5 |
|   Calculated NH$_3$:SO$_4$ mole ratio | 1.1 |
| Retention time, min. | 4.0 |
| Temperature, °F | 250 |
| Urea solution (or melt) | |
|   Temperature, °F | 290 |
|   Biuret, wt.% | 2.1 |
| Second stage | |
| Feed rate, g./min. | |
|   Urea | 157.8 |
|   NH$_3$ | 22.5 |
| Retention time, min. | 2.4 |
| Temperature, °F | 295 |
| Product | |
|   pH, 5% solution | 6.6 |
| Analysis, wt.% | |
|   Total N | 37.1 |
|   NH$_3$-N | 6.9 |
|   SO$_4$ | 24.2 |
|   Biuret | 3.4 |
|   H$_2$O% | 2.0 |
| Grade, % | |
|   N | 37.1 |
|   S | 8.1 |
| NH$_3$:H$_2$SO$_4$ mole ratio | 2.0 |
| Urea decomposition, % of urea | |
|   Hydrolyzed | 4.5 |
|   Forming biuret | 3.1 |

The products were again collected and cooled as in Example I. The products were again hard and friable with a relatively low moisture content.

EXAMPLE IV

Production of a 36-0-0-9S grade urea-ammonium sulfate fertilizer was demonstrated in the same equipment described in Example I supra. The feed materials were again diluted chemically pure sulfuric acid (60 percent H$_2$SO$_4$), ammonia, and molten urea.

The conditions and results of the test were as follows:

| | |
|---|---|
| Urea:(NH$_4$)$_2$SO$_4$ weight ratio | 1.5 |
| First stage | |
| Feed rate, g/min | |
|   H$_2$SO$_4$ (60 percent) | 100 |
|   NH$_3$ | 11.5 |
|   Calculated NH$_3$:SO$_4$ mole ratio | 1.1 |
| Retention time, min. | 4.0 |
| Temperature, °F | 250 |
| Urea solution (or melt) | |
|   Temperature, °F | 295 |
|   Biuret, wt. % | 2.2 |
| Second stage | |
| Feed rate, g/min | |
|   Urea | 147.4 |
|   NH$_3$ | 22.5 |
| Retention time, min. | 2.7 |
| Temperature, °F | 300 |
| Product | |
|   pH, 5 percent solution | 6.6 |
| Analysis, wt. % | |
|   Total N | 35.3 |
|   NH$_3$-N | 8.2 |
|   SO$_4$ | 28.1 |
|   Biuret | 4.0 |
|   H$_2$O | 2.4 |
| Grade, % | |
|   N | 35.3 |
|   S | 9.4 |
| NH$_3$:H$_2$SO$_4$ mole ratio | 2.0 |
| Urea decomposition, % of urea | |
|   Hydrolyzed | 10.2 |
|   Forming biuret | 4.7 |

The products were again collected and cooled as in Example I supra. The products were again hard and friable with a relatively low moisture content. The moisture content could be reduced further in a granulation step. The urea losses were relatively large, but could be minimized in a pipe, or tee, reactor that normally has a very short retention time.

After sifting and winnowing through the data supra, as well as other results of tests and operation of our new, novel, and improved method of production for urea-ammonium sulfates, we now present the acceptable and preferred parameters and variables as shown below.

| | Operating Range | Preferred (about) | Most Preferred |
|---|---|---|---|
| First stage | | | |
| Sulfuric acid concentration (% H$_2$SO$_4$) | 25–95 | 40–70 | 50–60 |
| NH$_3$:SO$_4$ mole ratio | 0.7–1.3 | 0.9–1.2 | 1.0–1.1 |
| Retention time, minutes | 1–15 | 1–7 | 1–4 |
| Temperature, °F | 220–350 | 230–270 | 250–260 |
| Urea solution (or melt) | | | |
| Concentration (% urea) | 65–100 | 95–100 | 98–100 |
| Temperature, °F | 270–320 | 270–300 | 270–280 |
| Second stage | | | |
| Retention time, seconds | 1–300 | 1–90 | 1–15 |
| Temperature, °F | 270–320 | 280–310 | 280–300 |
| NH$_3$:H$_2$SO$_4$ mole ratio | 1.7–2.0 | 1.8–2.0 | 1.9–2.0 |
| Product | | | |
| Moisture (% H$_2$O) | 0.1–5 | 0.1–2.0 | 0.1–0.5 |

Wide ranges of concentration for both the sulfuric acid and urea are possible as outside heat may be supplied to remove any excess water. The retention time of the first stage cannot be too low or adequate water vapor disengagement will not be accomplished; if the retention time is too long the equipment costs will be excessive. The temperature of the first stage can range considerably, but too high a temperature will not allow adequate ammoniation and too low will not remove enough moisture. The second stage temperatures are more critical and are dependent to a large extent on the grade product being made. Low sulfur grade products can use a longer retention time and higher temperatures than high-sulfur grade products. Urea losses and product fluidity are effected by the retention time and temperature.

While we have shown and described particular embodiments of our invention, modifications and variations thereof will occur to those skilled in the art. We wish it to be understood therefore that the appended claims are intended to cover such modifications which are within the true scope and spirit of our invention.

What we claim as new and desire to secure by letters patent of the United States is:

1. A process for the production of solid urea-ammonium sulfate fertilizers from sulfuric acid, ammonia, and urea, which comprises the steps of:

a. simultaneously introducing into a first-stage reacting means a stream of sulfuric acid and a stream of ammonia, said sulfuric acid containing from about 25 to about 95 percent $H_2SO_4$ and the relative proportions of said ammonia and said sulfuric acid fed thereto sufficient to yield therein an $NH_3:SO_4$ mole ratio in the range from about 0.7 to about 1.3;

b. retaining the resulting ammonium bisulfate intermediate product in said first-stage reacting means at a temperature in the range from about 200°F to about 350°F for a period of time ranging from about 1 minute to about 15 minutes; said residence time and said temperatures being sufficient to effect predetermined water vapor disengagement mentioned in step (e) infra from said intermediate bisulfate product in said first-stage reacting means;

c. withdrawing from said first-stage reacting means at least a portion of said ammonium bisulfate intermediate product produced therein and simultaneously introducing same, together with a stream of ammonia and a stream of urea, into a second-stage reacting means, the proportion of ammonia fed thereto in relation to said ammonium bisulfate being sufficient to effect therein an $NH_3:SO_4$ mole ratio ranging from about 1.7 to about 2.0, said urea stream fed to said second-stage reacting means containing from about 95 percent to about 100 percent urea by weight and introduced thereinto at a temperature substantially about equal to the temperature of the material maintained therein ranging from about 270°F to about 320°F;

d. retaining the resulting homogeneous mixture of urea-ammonium sulfate co-melt and particulate ammonium sulfate in said second-stage reacting means for a period of time ranging from about one to about 300 seconds:

e. offgasing from said second-stage reacting means mainly ammonia and water vapor, the quantity of said water vapor so offgased together with that removed by disengagement from said first-stage reacting means in step (b) supra being sufficient in toto to ultimately yield said solid urea-ammonium sulfate product with a moisture content ranging from about 0.1 to about 5 percent by weight and being substantially effected by the autogenous heat of reaction; and f. removing at least a portion of the resulting homogeneous mixture of urea-ammonium sulfate co-melt and particulate ammonium sulfate, said urea melt containing upwards of about 50 percent of the input ammonium sulfate as co-melt therewith, to granulation means wherefrom is removed as product said solid urea ammonium sulfate.

2. The process of claim 1 wherein the concentration of the urea introduced into said second-stage reacting means ranges from about 65 percent to about 95 percent by weight and wherein external heat energy is supplied to second-stage reacting means in amounts sufficient to effect water vapor offgasing therefrom in combination with the water vapor disengagement from step (b) thereof to yield an ultimate solid urea ammonium sulfate product having the low moisture content specified in step (e).

3. The process of claim 1 wherein the material offgased in step (e) thereof is treated in scrubbing means and the ammonia recovered therein is recycled back to said first-stage reacting means.

4. The process of claim 2 wherein the material offgased in step (e) thereof is treated in scrubbing means and the ammonia recovered therein is recycled back to said first-stage reacting means.

5. A process for the production of solid urea-ammonium sulfate fertilizers from sulfuric acid, ammonia, and urea, which comprises the steps of:

a. simultaneously introducing into a first-stage reacting means a stream of sulfuric acid and a stream of ammonia, said sulfuric acid containing from about 40 to about 70 percent $H_2SO_4$ and the relative proportions of said ammonia and said sulfuric acid fed thereto sufficient to yield therein an $NH_3:SO_4$ mole ratio in the range from about 0.9 to about 1.2;

b. retaining the resulting ammonium bisulfate intermediate product in said first-stage reacting means at a temperature in the range from about 230°F to about 270°F for a period of time ranging from about 1 minute to about 7 minutes; said residence time and said temperatures being sufficient to effect predetermined water vapor disengagement mentioned in step (e) infra from said intermediate bisulfate product in said first-stage reacting means;

c. withdrawing from said first-stage reacting means at least a portion of said ammonium bisulfate intermediate product produced therein and simultaneously introducing same, together with a stream of ammonia and a stream of urea, into a second-stage reacting means, the proportion of ammonia fed thereto in relation to said ammonium bisulfate being sufficient toeffect therein an $NH_3:SO_4$ mole ratio ranging from about 1.8 to about 2.0, said urea stream fed to said second-stage reacting means containing from about 98 percent to about 100 percent urea by weight and introduced thereinto at a temperature substantially about equal to the temperature of the material maintained therein ranging from about 270°F to about 300°F;

d. retaining the resulting homogeneous mixture of urea-ammonium sulfate co-melt and particulate ammonium sulfate in said second-stage reacting means for a period of time ranging from about 1 to about 90 seconds;

e. offgasing from said second-stage reacting means mainly ammonia and water vapor, the quantity of said water vapor so offgased together with that removed by disengagement from said first-stage reacting means in step (b) supra being sufficient in toto to ultimately yield said solid urea-ammonium sulfate product with a moisture content ranging from about 0.1 to about 2 percent by weight and being substantially effected by the autogenous heat of reaction; and f. removing at least a portion of the resulting homogeneous mixture of urea-ammonium sulfate co-melt and particulate ammonium sulfate, said urea melt containing upwards of about 50 percent of the input ammonium sulfate as co-melt therewith, to granulation means wherefrom is removed as product said solid urea ammonium sulfate.

6. The process of claim 5 wherein the concentration of the urea introduced into said second-stage reacting means ranges from about 65 percent to about 75 percent by weight and wherein external heat energy is supplied to second-stage reacting means in amounts sufficient to effect water vapor offgasing therefrom in combination with the water vapor disengagement from step (b) thereof to yield an ultimate solid urea ammonium sulfate product having the low moisture content specified in step (e).

7. The process of claim 5 wherein the material offgased in step (e) thereof is treated in scrubbing means and the ammonia recovered therein is recycled back to said first-stage reacting means.

8. The process of claim 6 wherein the material offgased in step (e) thereof is treated in scrubbing means and the ammonia recovered therein is recyled back to said first-stage reacting means.

9. A process for the production of solid urea-ammonium sulfate fertilizers from sulfuric acid, ammonia, and urea, which comprises the steps of:

a. simultaneously introducing into a first-stage reacting means a stream of sulfuric acid and a stream of ammonia, said sulfuric acid containing from about 50 to about 60 percent $H_2SO_4$ and the relative proportions of said ammonia and said sulfuric acid fed thereto sufficient to yield therein an $NH_3:SO_4$ mole ratio in the range from about 1.0 to about 1.1;

b. retaining the resulting ammonium bisulfate intermediate product in said first-stage reacting means at a temperature in the range from about 250°F to about 260°F for a period of time ranging from about 1 minute to about 4 minutes; said residence time and said temperatures being sufficient to effect predetermined water vapor disengagement mentioned in step (e) infra from said intermediate bisulfate product in said first-stage reacting means;

c. withdrawing from said first-stage reacting means at least a portion of said ammonium bisulfate intermediate product produced therein and simultaneously introducing same, together with a stream of ammonia and a stream of urea, into a second-stage reacting means, the proportion of ammonia fed thereto in relation to said ammonium bisulfate being sufficient to effect therein an $NH_3:SO_4$ mole ratio ranging from about 1.9 to about 2.0, said urea stream fed to said second-stage reacting means containing at least about 99 percent urea by weight and introduced thereinto at a temperature substantially about equal to the temperature of the material maintained therein ranging from about 270°F to about 280°F;

d. retaining the resulting homogeneous mixture of urea-ammonium sulfate co-melt and particulate ammonium sulfate in said second-stage reacting means for a period of time ranging from about 1 to about 15 seconds;

e. offgasing from said second-stage reacting means mainly ammonia and water vapor, the quantity of said water vapor so offgased together with that removed by disengagement from said first-stage reacting means in step (b) supra being sufficient in toto to ultimately yield said solid urea-ammonium sulfate product with a moisture content ranging from about 0.1 to about 0.5 percent by weight and being substantially effected by the autogenous heat of reaction; and f. removing at least a portion of the resulting homogeneous mixture of urea-ammonium sulfate co-melt and particulate ammonium sulfate, said urea melt containing upwards of about 50 percent of the input ammonium sulfate as co-melt therewith, to granulation means wherefrom is removed as product said solid urea ammonium sulfate.

10. The process of claim 9 wherein the concentration of the urea introduced into said second-stage reacting means is about 75 percent by weight and wherein external heat energy is supplied to second-stage reacting means in amounts sufficient to effect water vapor offgasing therefrom in combination with the water vapor disengagement from step (b) thereof to yield an ultimate solid urea ammonium sulfate product having the low moisture content specified in step (e).

11. The process of claim 9 wherein the material off gased in step (e) thereof is treated in scrubbing means and the ammonia recovered therein is recycled back to said first-stage reacting means.

12. The process of claim 10 wherein the material offgased in step (ed) thereof is treated in scrubbing means and the ammonia recovered therein is recycled back to said first-stage reacting means.

13. The process of claim 9 wherein said second-stage reacting means is a common pipe reactor.

* * * * *

UNITED STATES PATENT AND TRADEMARK OFFICE
CERTIFICATE OF CORRECTION

PATENT NO. : 3,928,015
DATED : December 23, 1975
INVENTOR(S) : Milton R. Siegel and Oscar E. Moore It is certified that error appears in the above-identified patent and that said Letters Patent are hereby corrected as shown below:

On the cover page in the title of the invention, change "SULATE" to
    -- SULFATE --
Column 1, line 1, in the title, change "SULATE" to -- SULFATE --
Column 2, line 16, after "mole" change "ration" to -- ratio --
Column 3, line 30, after "but" change "nor" to -- not --
Column 7, claim 1, line 39, change "200°F" to -- 220°F --

Signed and Sealed this sixteenth Day of March 1976

[SEAL]

Attest:

RUTH C. MASON
*Attesting Officer*

C. MARSHALL DANN
*Commissioner of Patents and Trademarks*